UNITED STATES PATENT OFFICE.

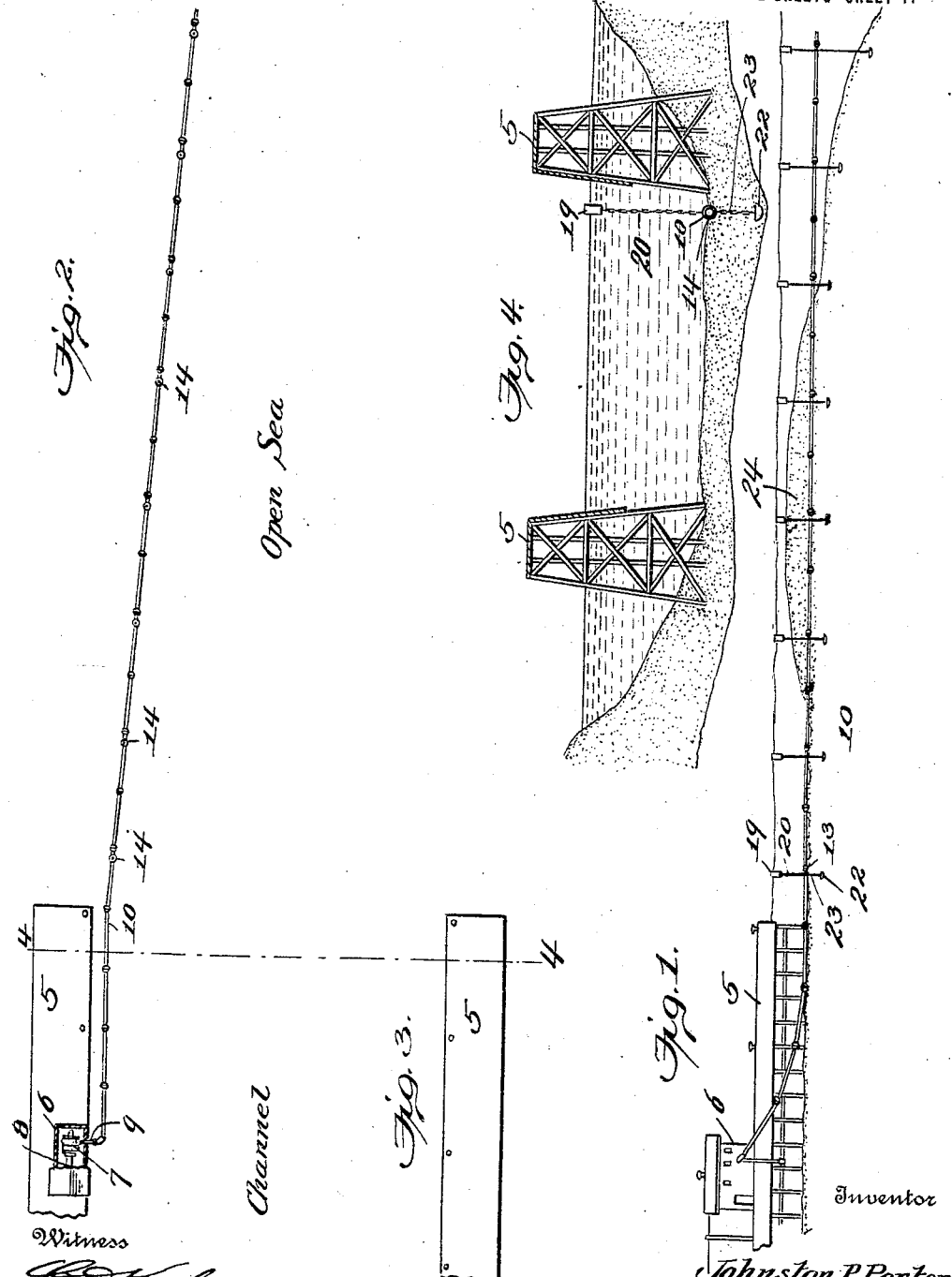

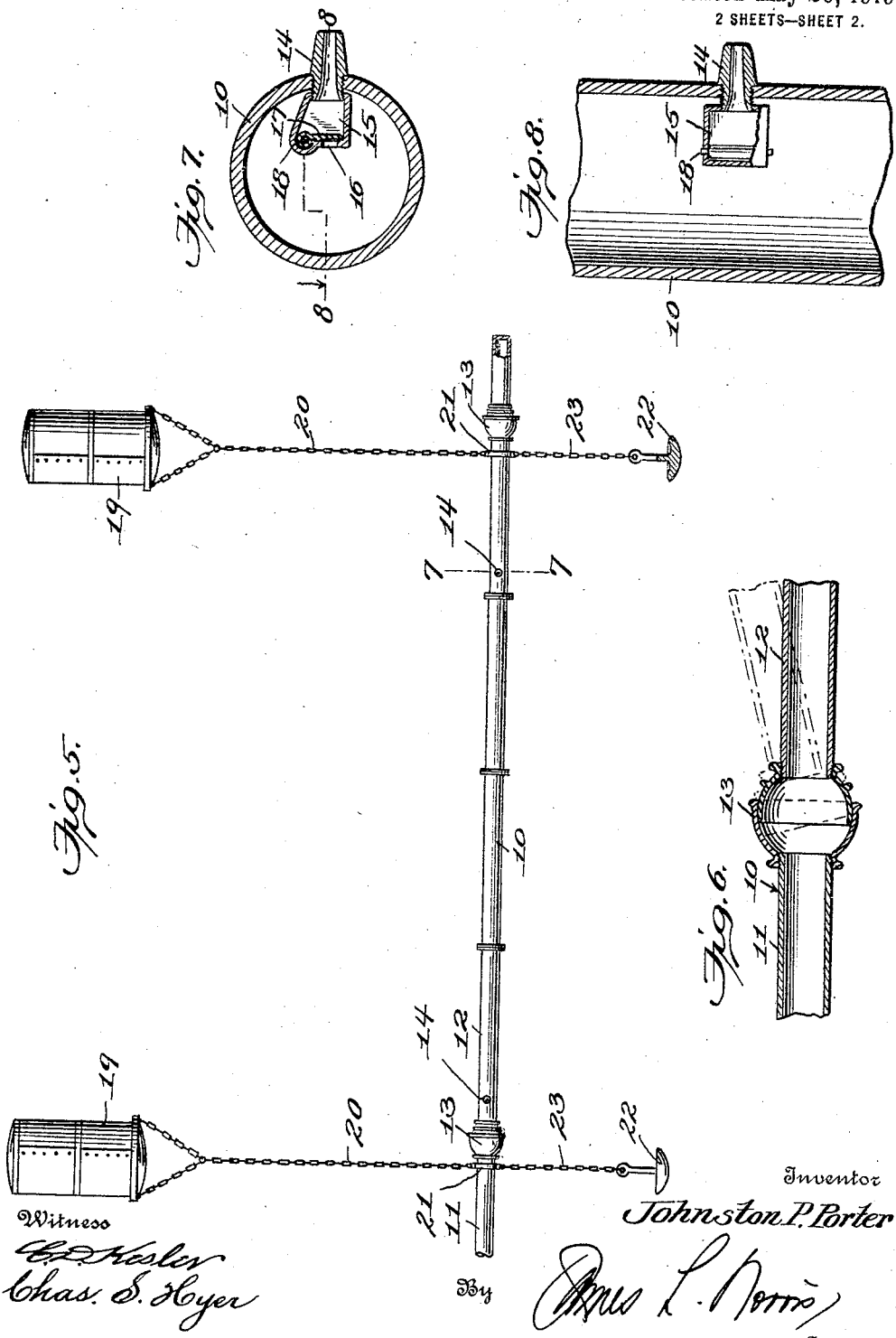

JOHNSTON P. PORTER, OF PORTLAND, OREGON.

MEANS FOR REMOVING SAND-BARS AND OTHER WATER ACCUMULATIONS.

1,304,509.  Specification of Letters Patent.  Patented May 20, 1919.

Application filed March 15, 1917, Serial No. 155,035. Renewed December 18, 1918. Serial No. 267,407.

*To all whom it may concern:*

Be it known that I, JOHNSTON P. PORTER, a citizen of the United States, residing at Portland, in the county of Multnomah, and State of Oregon, have invented new and useful Improvements in Means for Removing Sand-Bars and other Water Accumulations, of which the following is a specification.

This invention relates to a means for removing sand bars and other accumulations on ocean bottoms or beds of other bodies of water; and among other objects of the invention the principal one is to uniformly preserve a certain water depth at the intersection or effluence of bodies of water or in the beds of rivers or other streams that are subject to variation by tide or current action operating in conjunction with an applied liquid under pressure to agitate and disseminate sand or other accumulated matter and cause the latter to be carried off for instance during ebb tidewater or by the current of a stream or river. A further object of the invention is to provide a comparatively simple apparatus including a conduit means for delivering jets of water under pressure at a uniform depth relatively to a part of an ocean or river bed in such direction relatively to the latter as to stir up and effect a mixture of sand or other accumulation with the water and cause the accumulation to be carried out to sea or away from the point of tendency to accumulate by the tide or current.

With these and other objects and advantages in view the invention consists in the construction and arrangement of the several parts of the apparatus which will be more fully hereinafter described and claimed.

In the drawings:

Figure 1 is a sectional elevation showing a portion of the bed of an ocean or river or other body of water with the apparatus embodying the features of the invention.

Fig. 2 is a top plan view of the apparatus and a part of the jetty.

Fig. 3 is a top plan view of a portion of a jetty which is to be considered in combination with Fig. 2 in the provision of a channel leading to the open sea.

Fig. 4 is a section on the line 4—4 through the jetties as shown by Figs. 2 and 3 and transversely with respect to the channel and bed of the latter between the jetties.

Fig. 5 is an enlarged side elevation showing the pipe or conduit for conveying water under pressure and delivering the water in jets adjacent to the ocean or river bed and also illustrating suspending buoys and anchors.

Fig. 6 is a longitudinal vertical section of a portion of the water conveying and applying pipe and particularly illustrating a flexible joint connection therefor which may be duplicated throughout the length of the same.

Fig. 7 is an enlarged transverse vertical section taken in the plane of the line 7—7, Fig. 5.

Fig. 8 is a horizontal section taken in the plane of the line 8—8, Fig. 7.

The numeral 5 designates jetties, the two jetties as shown by Figs. 2 and 3 defining a channel leading to the open sea to illustrate the preferred placement of the main elements of the apparatus and the point at which the method is effectively carried on. On the one jetty a pump house 6 is erected and has therein a suitable pump 7, but preferably of a two-stage turbine type having a water feed pipe, as at 8, and an outlet pipe 9. Connected to the outlet pipe 9 is a conduit or pipe 10 made up of a plurality of sections 11 and 12, as clearly shown by Fig. 6, terminally connected by flexible joints 13. The flexible joints or couplings 13 may be of any preferred form and the structure thereof as illustrated by Fig. 6 demonstrates one type that may be used. The pipe sections 11 and 12 may be of any length and the flexible joints or couplings 13 prevent any damage being caused to the pipe length or pipe as a whole by surging of the water. Furthermore, the flexible joints or couplings 13 permit the pipe or conduit 10 as a whole to be readily laid or deposited in operative position and to conform to the bed surface on which it may at times rest during the operation or the method carried on to disseminate accumulations and prevent the formation of bars or other fillings. At regular intervals throughout the length of the pipe 10 nozzles 14 are provided which are preferably of the specific construction shown by Figs. 7 and 8 and connect with closed traps or chambers 15 disposed within the pipe 10 and provided with openings 16 in the inner end walls, there being one opening establishing communication between each trap or chamber 15 and the interior of the pipe 10, each opening 16 having a gravitating or flap valve 17 coöperating therewith and pivoted or fulcrumed in the top portion of the trap or chamber 15, as at 18. The object of these traps or chambers 15 is to prevent sand or other accumulation that may pass through the nozzles 14 from entering the pipe 10, the valves 17 being free to swing outwardly to permit the contents of the pipe 10 under pressure to escape through the nozzles 14, but preventing any matter passing through the said nozzles into the traps or chambers from entering the pipe 10 through the openings or ports 16, and by this means the pipe 10 will be always maintained free of any accumulations therein. The nozzles 14 project outwardly from the conduit or pipe 10 in planes at right angles to the latter and uniformly deliver the water forced under pressure therethrough in a horizontal plane in the form of straight jets so as to thoroughly and effectively cut into and stir up and circulate the accumulations straight across the channel adapted to be cleared of accumulations. The pipe 10 will be held at a predetermined or desired depth by a plurality of buoys 19 flexibly connected by chains or other devices 20 to collars 21 engaging the said pipe, and to these collars anchors 22 are also connected by flexible chains or other devices 23 and located a suitable distance below the level of submergence of the pipe 10. The buoys 19 will be preferably of the barrel type and capable of supporting the full weight of the pipe 10 so that the said pipe cannot sink beyond a certain fixed depth, of say about thirty feet. Should the sand or accumulation bank be higher than the specific depth just specified, the pipe 10 will lie upon this higher portion of the bank and gradually cut its way downwardly until the supporting chains and buoys prevent it moving out of position, as indicated at 24, see Fig. 1. The anchors 22, which will be preferably of the mushroom type, will prevent displacement of the pipe 10 from the position where it is desired to carry on the method. Before placing the pipe 10 in position to carry on the method the buoys and anchors will be attached thereto and the pipe will be so disposed as to have all of the nozzles 14 project in line with the horizontal diameter or in a sidewise direction. In order to place the pipe 10 in position it is proposed to suspend it by means of ropes from the buoys or scows and tow it into place, and when in position all the ropes will be simultaneously cut and the pipe allowed to settle on the bottom or bed of the body of water where it is desired to practice the method.

The pump 7 will be operated by any suitable motor means, as for instance by an electric current, and during its operation water is forced along or through the pipe 10 at about one hundred twenty pounds pressure so as to produce strong water jets at each of the nozzles 14. The water forced out of the nozzles 14 under the pressure specified stirs up the sand in the vicinity of the pipe 10 or similarly agitates any other accumulation and the sand thus lifted or disturbed from its deposit along the line of the pipe 10 will be carried out to sea by a water current or by ebb tidewater, and in the practice of the method in small bodies of water or rivers an accumulation of deposit in the bed or bottom thereof may be scattered and a certain channel depth maintained at a comparatively small expense. The nozzles 14 will be spaced about thirty feet apart and the jets of water from the nozzle under the pressure described will sweep across the channel that may be adjacent to the pipe 10 either to prevent any sand from settling in the channel or to stir up sand and other accumulation that may have settled in the channel during the incoming tide. As hereinbefore explained, the sand or accumulation will be prevented from entering the pipe through the nozzles 14 by the valves 17 which act as checks, though said valves do not obstruct the practical injection of the water relatively to the sand or other accumulation in carrying out the method. The pipe 10 may be either placed in longitudinal straight position or curved, as may be found desirable or necessary.

What is claimed as new is:

1. Means for removing sand bars and other accumulations from water beds or bottoms, consisting of flexibly jointed pipe sections provided with nozzles extending horizontally outwardly uniformly along one side of the sections at intervals, said nozzles partially projecting into the pipe sections and each having a trap chamber on its inner end to prevent sand passing through the nozzle from entering the pipe section in which the nozzle is located, means for retaining the pipe sections in applied position, and means for forcing water through the pipe sections and nozzles.

2. Means for removing sand bars and other accumulations from water beds or bottoms, consisting of a flexibly jointed pipe having nozzles extending outwardly therefrom uniformly in a horizontal plane and having their inner ends projecting within the pipe, a trap chamber connected to the inner end of each nozzle within the pipe, an opening being formed in the rear wall of the chamber, an outwardly movable flap valve hinged to the outer side of the rear wall of the chamber and normally closing said opening, means for holding the pipe in fixed applied position, and means for forcing water under pressure through the pipe and outwardly through the trap chambers and nozzles.

In testimony whereof I have hereunto set my hand in presence of two subscribing witnesses.

JOHNSTON P. PORTER.

Witnesses:
OTTO C. HARTMAN,
A. B. HUDSON.

Copies of this patent may be obtained for five cents each, by addressing the "Commissioner of Patents, Washington, D. C."